United States Patent [19]

Okubo et al.

[11] Patent Number: 4,979,129

[45] Date of Patent: Dec. 18, 1990

[54] DIGITAL COLOR CONVERTING APPARATUS FOR COLOR IMAGE PROCESSOR

[75] Inventors: Hiromi Okubo, Tokyo; Takanori Itoh, Yokohama; Kazuo Murai, Tokyo, all of Japan

[73] Assignee: Ricoh Company, Japan

[21] Appl. No.: 153,726

[22] Filed: Feb. 8, 1988

[30] Foreign Application Priority Data

Feb. 9, 1987 [JP] Japan .................................. 62-27882
Feb. 9, 1987 [JP] Japan .................................. 62-27883

[51] Int. Cl.⁵ ........................................... G06F 15/20
[52] U.S. Cl. ..................................... 364/518; 355/35; 346/157; 358/401
[58] Field of Search ....................... 364/522, 521, 518; 355/33, 35, 38; 358/22, 80, 75, 4

[56] References Cited

U.S. PATENT DOCUMENTS

| | | | |
|---|---|---|---|
| 4,169,285 | 9/1979 | Walker | 364/518 |
| 4,258,385 | 3/1981 | Greenberg et al. | 358/22 |
| 4,434,467 | 2/1984 | Scott | 364/400 |
| 4,469,433 | 9/1984 | Kurata et al. | 355/4 |
| 4,525,736 | 6/1985 | Korman | 358/28 |
| 4,710,800 | 12/1987 | Fearing et al. | 358/22 |
| 4,710,806 | 12/1987 | Iwai et al. | 364/521 X |
| 4,720,803 | 1/1988 | Ishii | 364/521 |
| 4,769,695 | 9/1988 | Terashita | 358/76 |

*Primary Examiner*—Gary V. Harkcom
*Assistant Examiner*—Phu K. Nguyen

[57] ABSTRACT

A digital color converting apparatus applicable to a color copier and others for converting only a desired color included in a color image into another desired color. One of a plurality of input image signals which has the highest level is identified to determine a color to be rendered by the instantaneous signals and, then, whether the result of the identification and a color specified are coincident is determined. Hence, color conversion is effected only in those regions in which the image is regarded as being of the color specified. For color conversion, the input image signal associated with an original color to be changed is applied to an output terminal which is assigned to an alternative color while, at the same time, the input image signal associated with the alternative color is applied to an output terminal which is assigned to the original color, i.e., signals individually associated with the original and alternative colors are replaced with each other.

24 Claims, 11 Drawing Sheets

DIGITAL COLOR CONVERTING APPARATUS FOR COLOR IMAGE PROCESSOR

BACKGROUND OF THE INVENTION

The present invention relates to a digital color converting apparatus for converting a color by transforming a color image into a digital electric signal and processing the digital image signal. More particularly, the present invention is concerned with a digital color converting apparatus applicable to a digital color copier, a color image processor and others and capable of converting only a particular color of a color image into a desired color.

With a digital color copier, it is often desired to change the color of a part of an image which is carried on an original color document in the event of copying the document. Heretofore, a procedure for reproducing an image which is different in color from an original image as stated has been implemented with an expensive graphic work station. Specifically, the work station reads an original document through an image scanner, writes the resulting image data in an image memory having a large capacity, and displays the entire or a part of the image memory on a cathode-ray tube. Then, the operator marks a particular desired region of the image appearing on the cathode-ray tube by using a cursor and, then, enters a desired alternative color. An image processor changes those data which lie in the marked region into another color as specified by the operator, so that the alternative data are displayed on the cathode-ray tube. After repeatedly specifying the region and color as mentioned, the operator applies the modified image data to a color plotter or the like to produce a copy. A drawback with such an implementation is that the operator has to endure the troublesome and time-consuming work and, in addition, the processor is expensive due to the need for a large capacity image memory and a high resolution color cathode-ray tube.

In relation to an analog color copier, there has been proposed a system for producing a copy in different colors from an original document by changing the combination of color separating filters as well as the combination of colors of toner, as disclosed in Japanese Laid-Open Patent Publication (Kokai) No. 52-55542. Such a system, however, suffers from a shortcoming that the combination of optical filters cannot be changed without resorting to a complicated mechanism and, moreover, a copying cycle has to be repeated a great number of times to produce a single copy at the sacrifice of time.

SUMMARY OF THE INVENTION

It is, therefore, an object of the present invention to provide an economical digital color converting apparatus for a color image processor and others which allows only a particular color of a color image to be converted into another desired color by simple manipulation.

It is another object of the present invention to provide a digital color converting apparatus applicable to a color image processor and others which performs real-time processing and, thereby, eliminates the need for an image memory.

It is another object of the present invention to provide a generally improved digital color converting apparatus applicable to a color image processor and others.

In accordance with the present invention, there is provided a digital color converting apparatus comprising a color discriminating circuit for determining a relationship in level between at least two of input image signals which are each associated with a respective one of a plurality of basic colors separated, a color specifying circuit for producing electric signals which are individually associated with an original color to be changed and an alternative color each being associated with any of the basic colors, a signal selecting circuit for selectively applying at least a part of the input image signals to a plurality of signal output terminals which are each associated with a respective one of the basic colors, and a control circuit for controlling the signal selecting means in response to the electric signals outputted by the color specifying circuit and an electric signal outputted by the color discriminating circuit.

In accordance with the present invention, there is also provided a digital color converting apparatus comprising a color discriminating circuit for identifying one of plurality of input image signals, which are each associated with a respective one of a plurality of basic colors separated, which has the highest level, a color specifying circuit for producing an electric signal associated with an original color to be changed with an alternative color and associated with any of the basic colors, a signal selecting circuit for selectively applying at least a part of the input image signals to a plurality of signal output terminals which are each assigned to a respective one the basic colors, and a control circuit for controlling the signal selecting circuit in response to the electric signal outputted the color specifying circuit and an electric signal outputted by the color discriminating circuit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
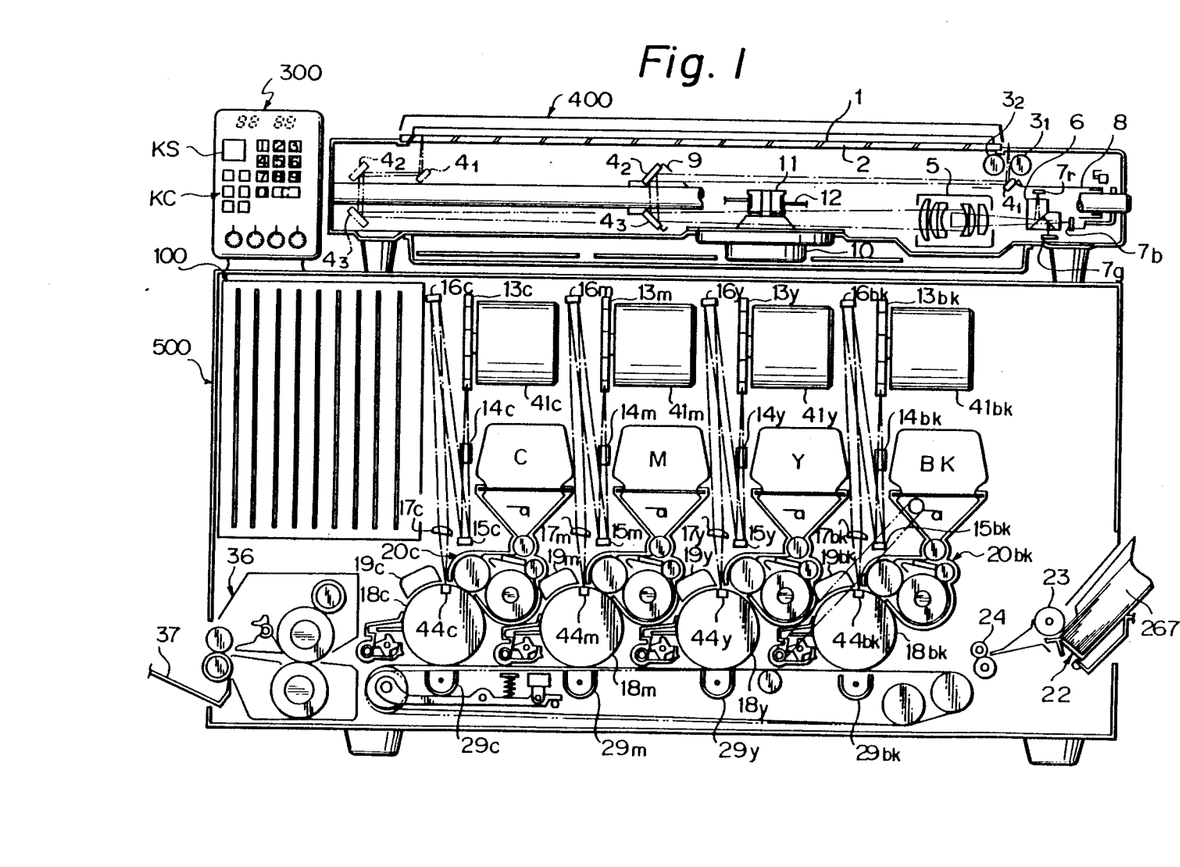
FIG. 1 is a front view of a digital color copier to which the present invention is applicable.

Referring to FIG. 1 of the drawings, a digital color copier to which the present invention is applicable is shown and includes an image scanner 400 for reading an original document and a plotter 500 located below the scanner 400. The plotter 500 is provided with an operation board 300. An original document 1 laid on a glass platen 2 is illuminated by lamps $3_1$ and $3_2$. Light reflected by the document 1 is reflected by a first mirror $4_1$, a second mirror $4_2$ and a third mirror $4_3$ which are movable and, then, transmitted through a lens 5 to reach a dichroic prism 6. The dichroic prism 6 separates the incident light into red (R), green (G) and blue (B) components which are different in wavelength from each other. These light components (R), (G) and (B) are incident to, respectively, charge coupled devices (CCDs) 7r, 7g and 7b which serve as imaging devices. The lamps $3_1$ and $3_2$ and the first mirror $4_1$ are mounted on a first carriage 8 while the second and third mirrors $4_2$ and $4_3$, respectively, are mounted on a second carriage 9. The second carriage 9 is moved at a speed which is one half the speed of the first carriage 8, so that the length of the optical path extending from the document 1 to the CCDs is maintained constant. To read the document 1, the first and second carriages 8 and 9 are moved from the right to the left as seen in FIG. 1. The first carriage 8 is connected to a carriage drive wire 12 which is passed over a carriage drive pulley 11 which is in turn rigidly connected to an output shaft of a carriage drive motor 10. The wire 12 is wound around a movable pulley, not shown, which is mounted on the second carriage 9. When the motor 10 is rotated either forwardly or reversely, the carriages 8 and 9 are moved forwardly (scanning stroke) or reversely (return stroke), the speed of the carriage 9 being one half the speed of the carriage 8.

Outputs of the CCDs 7r, 7g and 7b are subjected to analog-to-digital conversion and, then, applied to an image processing unit 100 to be individually transformed into bilevel signals, as described in detail later. The bilevel signals are adapted to energize semiconductor lasers which are individually assigned with black (BK), yellow (Y), magenta (M) and cyan (C), whereby laser beams modulated by the recording color signals (bilevel signals) are emitted. The laser beams issuing from the lasers are individually reflected by rotatable polygon mirrors 13bk, 13y, 13m and 13c to reach fourth mirrors 15bk, 15y, 15m and 15c and fifth mirrors 16bk, 16y, 16m and 16c by way of f-theta lenses 14bk, 14y, 14m and 14c. Reflected by these mirrors, the laser beams are individually focused onto photoconductive drums 18bk, 18y, 18m and 18c through cylindrical lenses 17bk, 17y, 17m and 17c. The polygon mirrors 13bk, 13y, 13m and 13c are mounted on output shafts of mirror drive motors 41bk, 41y, 41m and 41c, respectively. These motors 41bk, 41y, 41m and 41c are each driven at a constant speed to rotate its associated polygon mirror at a constant speed. By the rotation of the polygon mirrors, the laser beams are caused to scan their associated photoconductive drums 18bk, 18y, 18m and 18c in a direction perpendicular to the rotating direction of the latter (clockwise), i.e. along the axes of the drums.

Charge scorotrons 19bk, 19y, 19m and 19c are connected to a negative high-tension voltage source, not shown, so as to uniformly charge the surfaces of the drums 18bk, 18y, 18m and 18c, respectively. As any of the laser beams which have been modulated by the recording signals as previously stated scans the surface of its associated drum, the charge on the drum surface is caused to flow to ground and, therefore, disappears. Each laser is not turned on for those portions of the document 1 where the density is high and is turned on for those portions where the density is low. Hence, a potential of $-800$ volts is developed in those portions of the drums 18bk, 18y, 18m and 18c which correspond to dark regions of the document 1, and a potential of about $-100$ volts is developed in those portions of the drums which correspond to light regions of the document. As a result, a latent image is formed on each drum in association with the density distribution on the document 1. The latent images are individually developed by a black developing unit 20bk, a yellow developing unit 20y, a magenta developing unit 20m and a cyan developing unit 20c, whereby a black, a yellow, a magenta and a cyan toner image are produced on the drums 18bk, 18y, 18m and 18c, respectively. Toner stored in each developing unit is positively charged by agitation while each developing unit is biased to about $-200$ volts by a bias voltage generator, not shown, so that the toner is deposited on those portions of the drum where the surface potential is higher than the bias voltage to thereby develop a toner image.

A stack of paper sheets 267 loaded in a cassette 22 are fed one by one by a feed roller 23. The paper sheet 267 is driven by a register roller 24 to a transfer belt 25 at a predetermined timing. Then, the paper sheet 267 is sequentially transported by the belt 25 through a path which is defined below the drums 18bk, 18y, 18m and 18c. Transfer scorotrons 29bk, 29y, 29m and 29c located below the belt 25 are energized while the sheet 267 moves past their associated drums, sequentially transferring the black, yellow, magenta and cyan toner images to the paper sheet 267. Thereafter, the paper sheet 267 is fed to a fixing unit 36 to fix the toner and, then, driven out of the copier onto a tray 37.

Figure 2:
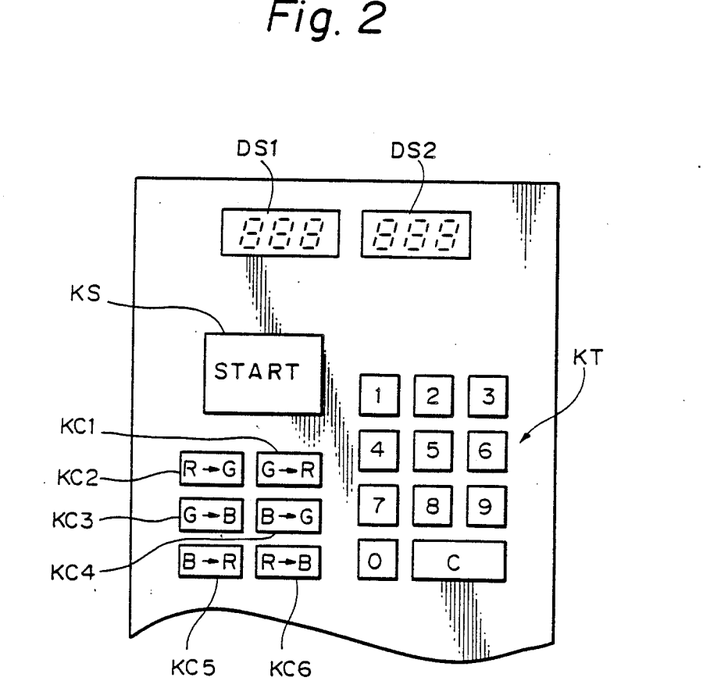
FIG. 2 is a fragmentary enlarged front view showing a part of an operation board which is included in the copier of FIG. 1.

FIG. 2 shows in an enlarged scale the operation board 300 which is provided on the copier of FIG. 1. Arranged on the operation board 300 are numerical displays DS1 and DS2, a print start key KS, numeral keys KT from 0 to 9, a clear key C, and six color conversion keys KC1, KC2, KC3, KC4, KC5 and KC6. The color conversion keys KC1 to KC6 may be operated to convert G (green) portions of a document image into R (red), to convert G portions into B (blue), to convert B portions into G, to convert B portions into R, and to convert R portions into B, respectively.

Figure 3:
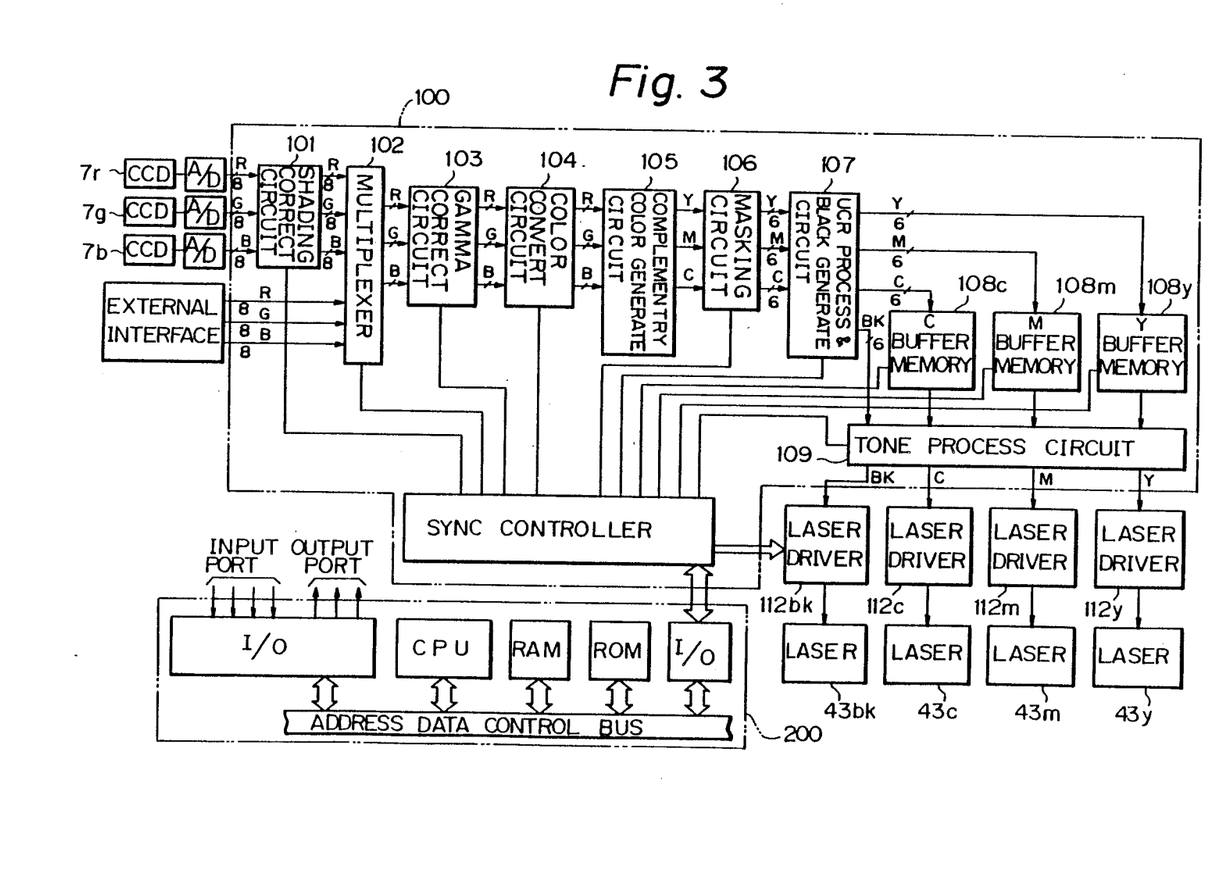
FIG. 3 is a schematic block diagram showing an electrical arrangement installed in the copier of FIG. 1.

Referring to FIG. 3, an electrical arrangement of the image processing system installed in the copier of FIG. 1 is shown. As shown, analog image signals outputted by the CCDs 7r, 7g and 7b are individually converted by analog-to-digital (A/D) converters into eight-bit digital signals and, then, applied to input terminals of the image processing unit 100. In the image processing unit 100, the image signals are each routed through a shading correction circuit 101, a multiplexer 102 and a gamma correction circuit 103 to reach a color conversion circuit 104. So long as color conversion which will be described is not executed, the input and output signals of the color conversion circuit 104 are identical. The outputs (R, G and B) of the color conversion circuit 104 are applied to a complementary color generating circuit 105 to be thereby transformed into a Y (yellow), an M (magenta) and a C (cyan) signal, respectively. Each having eight bits, the Y, M and C signals are passed through a masking circuit 106 to become six-bit signals and, then, fed to a UCR processing and black generating circuit 107 which produces a Y, M, C and BK (black) color signals. While the BK signal is directly fed to a tone processing circuit 109, the Y, M and C signals are fed thereto after being delayed by buffer memories 108y, 108m and 108c, respectively. The tone processing circuit 109 converts the incoming multi-level color signals into bilevel Y, M, C and BK signals by dither processing. The Y, M, C and BK signals outputted by the circuit 109 are applied to, respectively, laser drivers 112y, 112m, 112c and 112bk to energize semiconductor lasers 43y, 43m, 43c and writing image data on the individual drums.

Figure 4:
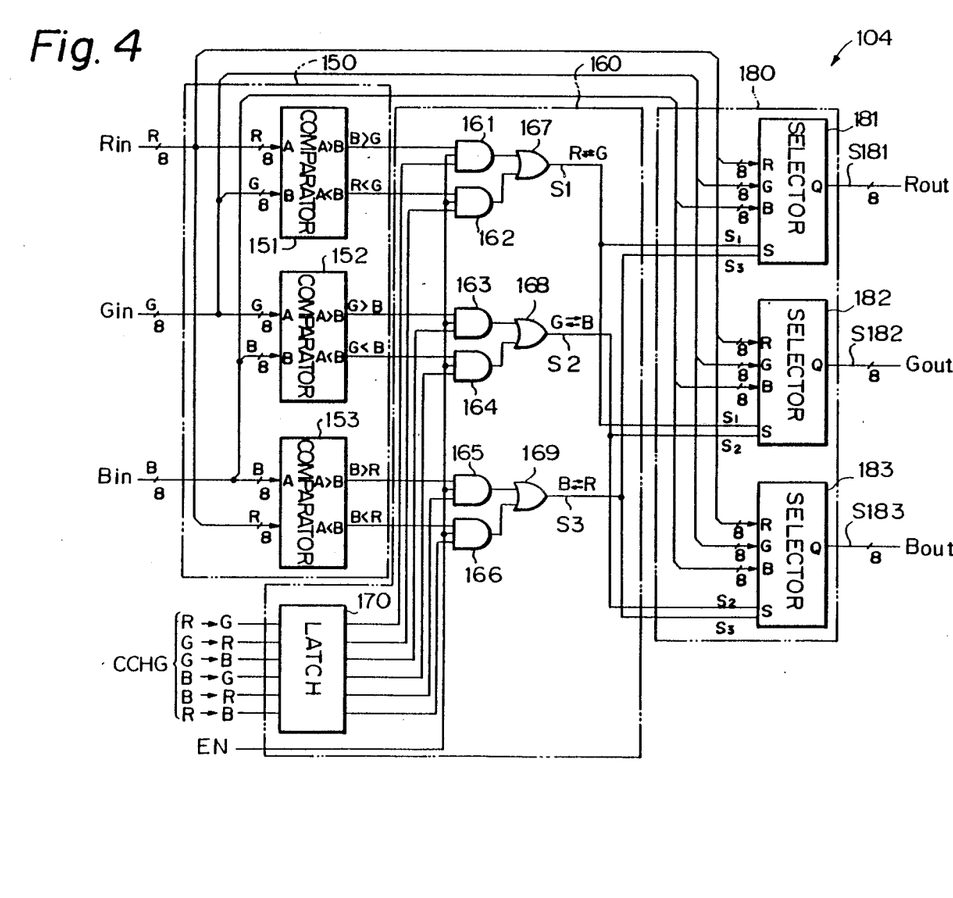
FIG. 4 is a schematic block diagram showing a specific construction of a color conversion circuit which is built in the arrangement of FIG. 3.

Referring to FIG. 4, a specific construction of the color conversion circuit 104 is shown and generally comprises an input color discriminating circuit 150, a color conversion control circuit 160, and a signal selecting circuit 180.

As shown in FIG. 4, the color conversion circuit 104 has input terminals Rin, Gin and Bin to which the R, G and B image signals outputted by the gamma correction circuit 103 are applied, respectively. The input color discriminating circuit 150 is provided with three digital comparators 151, 152 and 153. The R and G image signals are applied to, respectively, input terminals A and B of the comparator 151. The G and B image signals are applied to, respectively, input terminals A and B of the comparator 152. The B and R image signals are applied to, respectively, input terminals A and B of the comparator 153. Hence, the six bilevel outputs of the circuit 150 become high level when the conditions of R>G, R<G, G>B, G<B, B>R and B>R, respectively, are satisfied, otherwise remaining low level. The color conversion control circuit 160 is provided with AND gates 161, 162, 163, 164, 165 and 166, OR gates 167, 168 and 169, and a latch 170. A color conversion command signal CCHG is applied to a six-bit input terminal of the latch 170. Produced by a main controller shown in FIG. 3, the color conversion command signal CCHG has six bits which are associated one-to-one with the previously stated color conversion keys on the operation board 300. Specifically, when the keys KC2, KC1, KC3, KC4, KC5 and KC6 are depressed, bits 6 (most significant bit or MSB), 5, 4, 3, 2 and 1 (least significant bit or LSB), respectively, become high level. In the illustrative embodiment, a signal line EN is constantly held high level. A signal S1 appearing on the output of the OR gate 167 becomes high level only when the bit 6 of the signal CCHG is high level and the signal line representative of R>G is high level or when the bit 5 of the signal CCHG is high level and the signal line representative of R<G is high level. Likewise, a signal S2 appearing on the output of the OR gate 168 becomes high level only when the bit 4 of the signal CCHG is high level and the signal line representative of G>B is high level or when the bit 3 of the signal CCHG is high level and the signal line indicative of G<B is high level. The output signal S3 of the OR gate 169 becomes high level only when the bit 2 of the signal CCHG is high level and the signal line representative of B>R is high level or when the bit 1 of the signal CCHG is high level and the signal line representative of B<R is high level.

The signal selecting circuit 180 comprises three data selectors 181, 182 and 183 each having eight-bit input terminal R, G and B, an eight-bit output terminal Q, and a two-bit selection control terminal S. The R, G and B image signals are applied to, respectively, the input terminals R, G and B of the data selectors 181, 182 and 183. Signals S1 and S3 produced by the color conversion control circuit 160 are fed to the control terminal S of the data selector 181, signals S1 and S2 are fed to the control terminal S of the data selector 182, and signals S2 and S3 are applied to the control terminal S of the data selector 183.

The signals S1 to S3 outputted by the color conversion control circuit 160 and the signals S181, S182 and S183 outputted by the respective data selectors are associated with each other as shown in Table 1 below.

TABLE 1

| CONTROL SIGNAL | | | COLOR OF OUTPUT SIGNAL | | |
|---|---|---|---|---|---|
| S1 | S2 | S3 | S181 | S182 | S183 |
| L | L | L | R | G | B |
| H | L | L | G | R | B |
| L | H | L | R | B | G |
| L | L | H | B | G | R |

Specifically, in this particular embodiment, when conversion of a certain original color CLS into an alternative color CLD is commanded, the colors CLS and CLD of image signals coming in then are compared with respect to level and, if CLS is greater than CLD, signals associated with CLS and CLD are replaced with each other and, then, outputted. If CLS is equal to or smaller than CLD, such replacement is inhibited. For example, when the key CK2 is depressed to set up an R-to-G conversion mode, an image signal applied to the input terminal Rin is fed to an output terminal Rout and an image signal applied to the input terminal Gin to an output terminal Rout, in response to a signal which satisfies the condition R>G. An image signal applied to the input terminal Bin is directly fed to an output terminal Bout.

Figure 5:
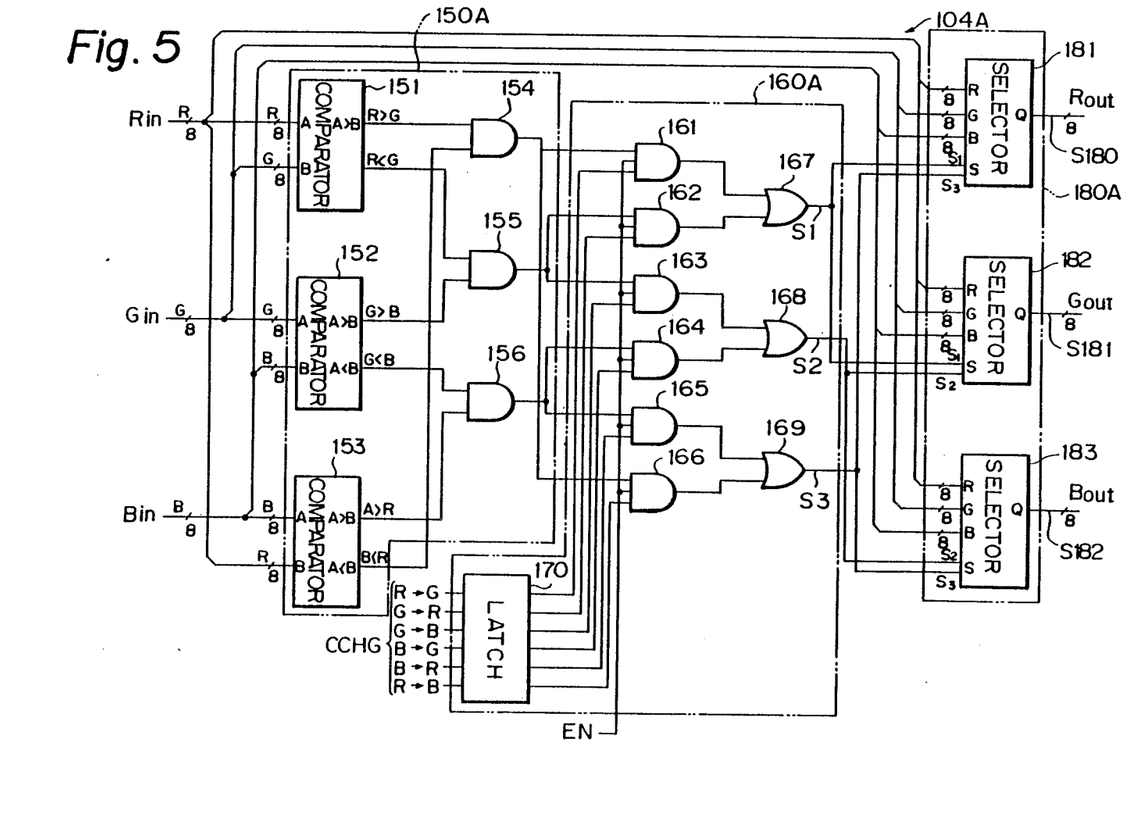
FIG. 5 is a schematic block diagram showing another specific construction of the color conversion circuit.

Referring to FIG. 5, another specific construction of the color conversion circuit is shown. In the figure, the same or similar structural elements as those shown in FIG. 4 are designated by like reference numerals.

As shown in FIG. 5, an input color discriminating circuit 150A includes three digital comparators 151, 152 and 153, and three AND gates 154, 155 and 156. The R and G image signals are applied to, respectively, input terminals A and B of the comparator 151; the G and B image signals are applied to, respectively, input terminals A and B of the comparator 152; and the B and R image signals are applied to, respectively, input terminals A and B of the comparator 153. The comparator 151 produces two signals R>G and R<G which become high level under the conditions of A>B and A<B, respectively. The comparator 152 produces two signals G>B and G<B which become high level under the conditions of A>B and A<B, respectively. Further, the comparator 153 produces two signals B>R and B<R which become high level under the conditions of A>B and A<B, respectively. Hence, the signal appearing on the output of the AND gate 154 becomes high level only when R is greater than G and, yet, greater than B. Likewise, the signal appearing on the output of the AND gate 155 becomes high level only when G is greater than B and, yet, greater than R. Further, the signal appearing on the output terminal of the AND gate 156 becomes high level only when B is greater than G and, yet, greater than R. Specifically, when one of the R, G and B signals which is highest in level is R, G or B, the output of the AND gate 154, that of the AND gate 155 or that of the AND gate 156 becomes high level.

As in the embodiment of FIG. 4, a color conversion control circuit 160A includes AND gates 161, 162, 163, 164, 165 and 166, OR gates 167, 168 and 169, and a latch 170. The color conversion command signal CCHG is applied to a six-bit input terminal of the latch 170. In FIG. 5, the signal S1 appearing on the output of the OR gate 167 becomes high level only when the bit 6 of the signal CCHG is high level and the R signal is higher in level than the G and B signals or when the bit 5 of the signal CCHG is high level and the G signal is higher in level than the others. Likewise, the output signal S2 of the OR gate 168 becomes high level only when the bit 4 of the signal CCHG is high level and the G signal is higher in level than the others or when the bit 3 of the signal CCHG is high level and the B signal is higher in level than the others. The output signal S3 of the OR gate 169 becomes high level only when the bit 2 of the CCHG is high level and the B signal is higher in level than the others or when the bit 1 of the signal CCHG is high level and the R signal is higher in level than the others.

A signal selecting circuit 180A, like that of FIG. 4, includes data selectors 181, 182 and 183 each having eight-bit input terminals R, G and B, an eight-bit output terminal Q and a two-bit selection control terminal S. The R, G and B image signals are applied to, respectively, the input terminals R, G and B of the data selectors 181, 182 and 183. Signals S1 and S3 outputted by the color conversion control circuit 160 are applied to the control terminal of the data selector 181, signals S1 and S2 are applied to the control terminal S of the data selector 182, and signals S2 and S3 are applied to the control terminal S of the data selector 183. The arrangement described so far is identical with that of FIG. 4. Also, the signals S1 to S3 and the colors of signals outputted by the data selectors are related as shown in Table 1.

Specifically, in the embodiment of FIG. 5, when conversion of a certain original color CLS into an alternative color CLD is commanded, whether or not the level of a CLS color component inputted is higher than the others is decided and, if it is, the CLS and CLD signals are replaced with each other. When any of the image signals is higher in level than the CLS signal, such replacement of signals is inhibited. For example, when the key KC2 is depressed to set up an R-to-G conversion mode, the image signal appearing on the input terminal Rin is applied to the output terminal Gout and the image signal appearing on the input terminal Gin is applied to the output terminal Rout, in response to a signal which satisfies the conditions of R>G and R>B. The image signal appearing on the input terminal Bin is directly fed to the output terminal Bout.

Figure 6:
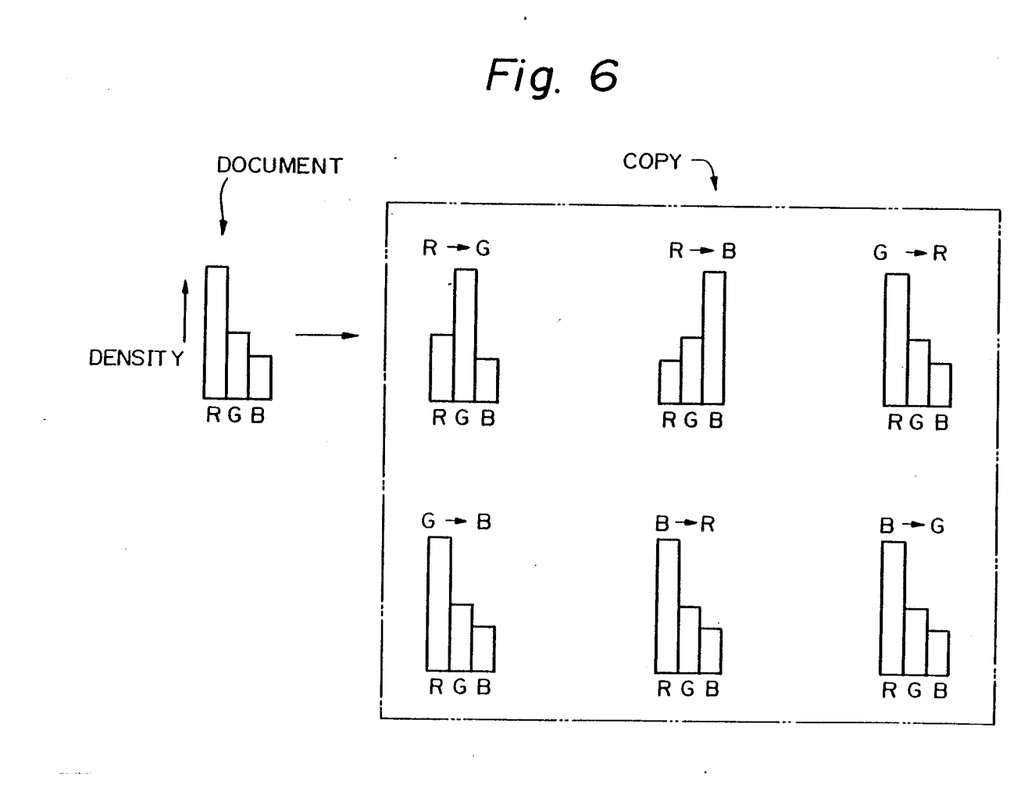
FIG. 6 is a chart representative of an exemplary relationship between the levels of red, green and blue which render a single color on an original document and those of red, green and blue which render a color on a copy.

FIG. 6 shows correspondence in density between the basic color components R, G and B which render a color at a certain point of a document and those which render a color on a copy. In the example shown in FIG. 6, the R component has a greater proportion than the G and B components and, therefore, the color appears to be red to the eye. Assuming that the operator desires to change such a color to green, he or she will recognize the color to be red and, then, depress the conversion key KC2. In this case, since the conditions of R>G and R>B for permitting conversion are satisfied, the R and G components on the document are replaced with each other when reproduced, as indicated by "R→G" in FIG. 6. On the other hand, assuming that the operator intends to change an image of a color which is close to blue and printed in another region of the document, the color conversion is not applied to the region of FIG. 6 because the conditions B>R and B>G are not satisfied. Specifically, a region which the operator recognizes as bearing an original color which is to be changed is subjected to color conversion, but a region which the operator does not recognize so is not. As a result, only that portion (color) of a document which is desired by the operator is changed in color when reproduced.

While the arrangement of FIG. 5 is such that an image signal associated with an original color and an image signal associated with an alternative color are replaced with each other between the input and output terminals, the arrangement may be modified such that an image signal associated with an original color is applied to the output terminal which is assigned to an original color while a certain fixed level (e.g. zero level) is fed to the output terminal which is assigned to the alternative color. In such an alternative case, however, since the colors reproducible after conversion are limited to those which are very close to the primary colors (R, G and B), the colors reproduced on a copy are apt to appear unnatural to the eye. Nevertheless, so long as the replacement of original and alternative colors as described above is adopted, when the color of a document image is halftone, that of a reproduced image, too, will be halftone and, therefore, appear natural.

Figure 7:
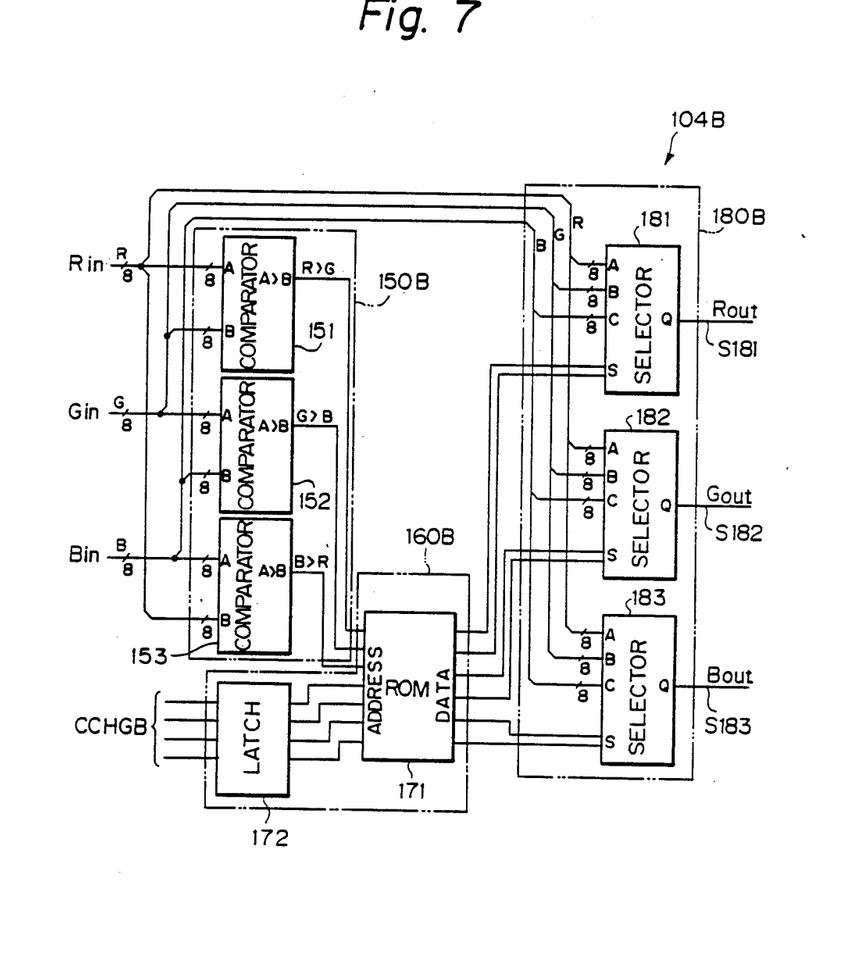
FIG. 7 is a schematic block diagram showing another specific construction of the color conversion circuit.

Referring to FIG. 7, still another specific construction of the color conversion circuit is shown. In the figure, the same or similar structural elements as those shown in FIGS. 4 and 5 are designated by like reference numerals. As shown, the color conversion circuit, generally 104B, is constituted by an input color discriminating circuit 150B, a color conversion control circuit 160B, and a signal selecting circuit 180B. The color conversion control circuit 160B uses only three of the six output signals of the input color identifying circuit 150B, i.e. signals R>B, R>B and B>R. For this reason, the circuit 150B is not provided with the AND gates 154, 155 and 156. A color conversion command signal CCHGB is produced by the main controller 200 in response to a command which may be entered on the operation board 300. The signal CCHGB is a four-bit signal representative of any of sixteen different kinds of coded color conversion command data. In this particular embodiment, several other color conversion keys are provided on the operation board 300 in order to accommodate such a great number of color conversion modes, although not shown in the figure. The sixteen codes of the signal CCHGB are individually associated with various color conversion modes as shown in Table 2 below.

TABLE 2

| CCHGB | OUTPUT TERMINAL | | | COLOR CONVERSION |
|---|---|---|---|---|
| | Rout | Gout | Bout | |
| 0 | $R_{signals}$ | $G_{signals}$ | $B_{signals}$ | NO |
| 1 | $G_{signals}$ | $R_{signals}$ | $B_{signals}$ | R → G |
| 2 | $B_{signals}$ | $G_{signals}$ | $R_{signals}$ | R → B |
| 3 | $R_{signals}$ | $R_{signals}$ | $B_{signals}$ | R → Y |

TABLE 2-continued

| CCHGB | OUTPUT TERMINAL | | | COLOR CONVERSION |
|---|---|---|---|---|
| | Rout | Gout | Bout | |
| 4 | $R_{signals}$ | $G_{signals}$ | $R_{signals}$ | R → M |
| 5 | #1 | $R_{signals}$ | $R_{signals}$ | R → C |
| 6 | $R_{signals}$ | $B_{signals}$ | $G_{signals}$ | G → B |
| 7 | $G_{signals}$ | $R_{signals}$ | $B_{signals}$ | G → R |
| 8 | $G_{signals}$ | $G_{signals}$ | $B_{signals}$ | G → Y |
| 9 | $G_{signals}$ | #2 | $G_{signals}$ | G → M |
| 10 | $R_{signals}$ | $G_{signals}$ | $G_{signals}$ | G → C |
| 11 | $B_{signals}$ | $G_{signals}$ | $R_{signals}$ | B → R |
| 12 | $R_{signals}$ | $B_{signals}$ | $G_{signals}$ | B → G |
| 13 | $B_{signals}$ | $B_{signals}$ | #3 | B → Y |
| 14 | $B_{signals}$ | $G_{signals}$ | $B_{signals}$ | B → M |
| 15 | $R_{signals}$ | $B_{signals}$ | $B_{signals}$ | B → C |

Note:
1 - G signal if G > B, B signal if G ≦ B
2 - R signal if R > B, B signal if R ≦ B
3 - R signal if R > G, G signal if R ≦ G As shown in Table 2, in this embodiment, even the colors Y, M and C may be selected as the alternative color based on the combinations of R, G and B. Generally, the colors R, G and B and the colors Y, M and C are related as represented by the following equations:

$$Y = R + G$$

$$M = R + B$$

$$C = G + B$$

In the illustrative embodiment, therefore, when any of Y, M and C is selected as an alternative color CLD, an image signal associated with the color CLS is applied to all the output terminals for a plurality of basic color components which render the color CLD. For example, when R-to-Y conversion is desired as shown in Table 2, the R image signal is applied to both the output terminals for R and G which render Y.

As shown in FIG. 7, the color conversion control circuit 160B includes a latch 172 and a read only memory (ROM) 171 which are adapted to hold the color conversion command signal CCHGB. The three-bit signals (R>G, G>B and B>R) outputted by the input color discriminating circuit 150B and the four-bit signal (CCHGB) outputted by the latch 172 are applied to a seven-bit address terminal of the ROM 171. Control signal data adapted to execute the signal replacement as shown in Table 2 in response to the color conversion command signal CCHGB are stored in a table in those memory addresses of the ROM 171 which are associated with CCHGB. Here, the conversion is effected only when the color of an input image signal is identical with the original color CLS. Specifically, it is only when, among the input R, G and B signals, the CLS (one of R, G, and B) signal component is of the highest level that signal replacement occurs. For example, when R is to be replaced with B, signal replacement is effected only if the signal level of R is higher than those of B and G, i.e. only if the R<B signal line is low level (R>B) and the R>G signal line is high level. A relationship between the various codes of CCHGB and the signal replacement allowed/inhibited is stored in a data table of ROM 171 in association with the combinations of three-bit signals R>G, G>B and B>R.

Referring to FIG. 6 again, the colors R, G and B are exemplarily shown as being noticeably different in level from each other. If R and G, for example, are equal in level, the composite color of R, G and B will not be recognized by the operator as being R or G. However, if the level of R is higher, if a little, than that of G while, for example, the R-to-B conversion mode is selected, color conversion is performed. While the change in hue is not noticeable in the R-to-G conversion mode because the difference in level between R and G is small, it is noticeable in the R-to-B conversion mode. This kind of conversion is not expected by the operator and, therefore, undesirable.

Figure 8:
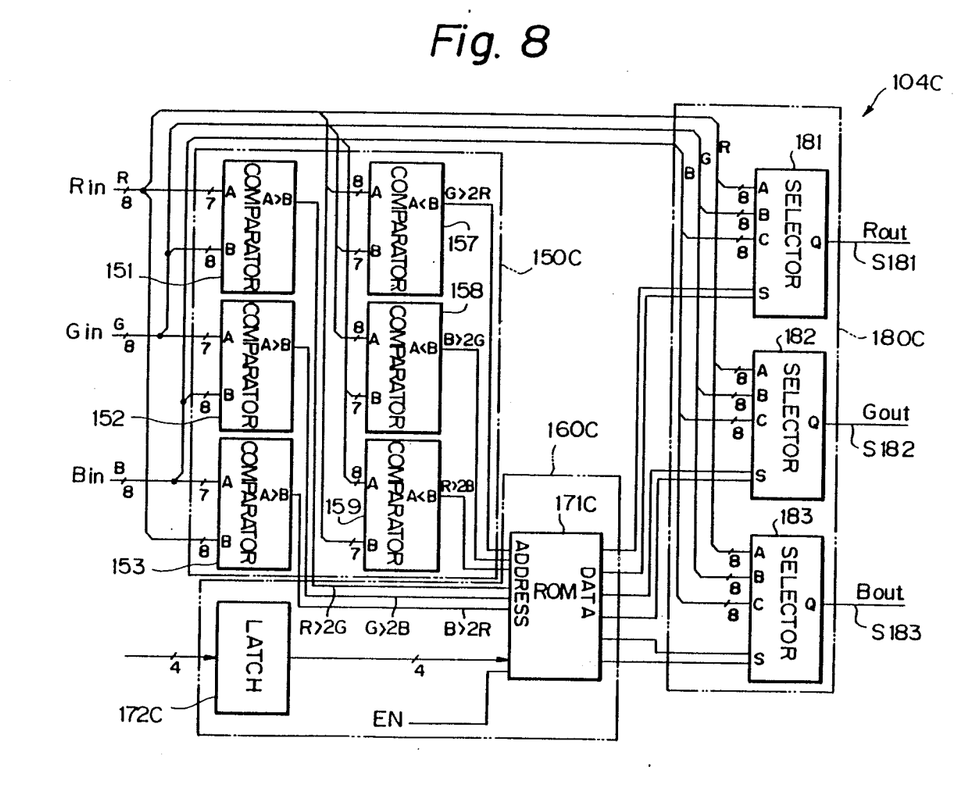
FIG. 8 is a schematic block diagram showing still another specific construction of the color conversion circuit.

Referring to FIG. 8, still another specific construction of the color conversion circuit in accordance with the present invention is shown which eliminates the above-stated undesirable color conversion. As shown, the color conversion circuit 104C is constituted by an input color discriminating circuit 150C, a color conversion control circuit 160C, and a signal selecting circuit 180C. This embodiment includes generally two different measures against the unwanted color conversion. One of them is the use of a different condition for the identification of an input color. Specifically, while in the embodiment of FIG. 7 conversion is permitted when one of the R, G and B input image signals which is associated with the original color CLS has the highest level, in the embodiment of FIG. 8 conversion is permitted when the level of the input image signal which is associated with the original color CLS is twice or more higher than those of the others.

The input color discriminating circuit 150C is made up of six digital comparators 151, 152, 153, 167, 158 and 159 each having input terminals A and B. Applied to the input terminals A and B of the comparators 151 to 159 are two of the R, G and B image signals inputted. One of the two signals is eight-bit and the other is seven-bit. Specifically, the seven-bit signal is produced by omitting the least significant bit (LSB) of the eight-bit signal inputted and shifted by one bit toward the lower bit side. While each input terminal of the above comparators is eight-bit, the most significant bit (MSB) of the terminals to which the seven-bit signal is applied is fixed at low level. The upper seven bits of the eight-bit R image signal are applied to the lower seven bits of the input terminal A of the comparator 151. Likewise, the seven-bit G signal and eight-bit B signal are applied to, respectively, the input terminals A and B of the comparator 152. The seven-bit B signal and eight-bit R signal are applied to, respectively, the input terminals A and B of the comparator 153. The eight-bit R signal and seven-bit G signal are applied to, respectively, the input terminals A and B of the comparator 154. The eight-bit G signal and seven-bit B signal are applied to, respectively, the input terminals A and B of the comparator 155. Further, the eight-bit B signal and seven-bit R signal are applied to, respectively, the terminals A and B of the comparator 156. In this configuration, the output signals of the comparators 151, 152, 153, 157, 158 and 159 are representive of whether or not the conditions of R>2.G, G>2.B, B>2.R, G>2.R, B>2.G and R>2.B, respectively, are satisfied, and each becomes high level if its associated condition is satisfied and low level if otherwise. For example, when the R-to-G conversion mode is selected, conversion is not executed unless two conditions, R>2.G and R>2.B, are satisfied at the same time.

Figure 9:
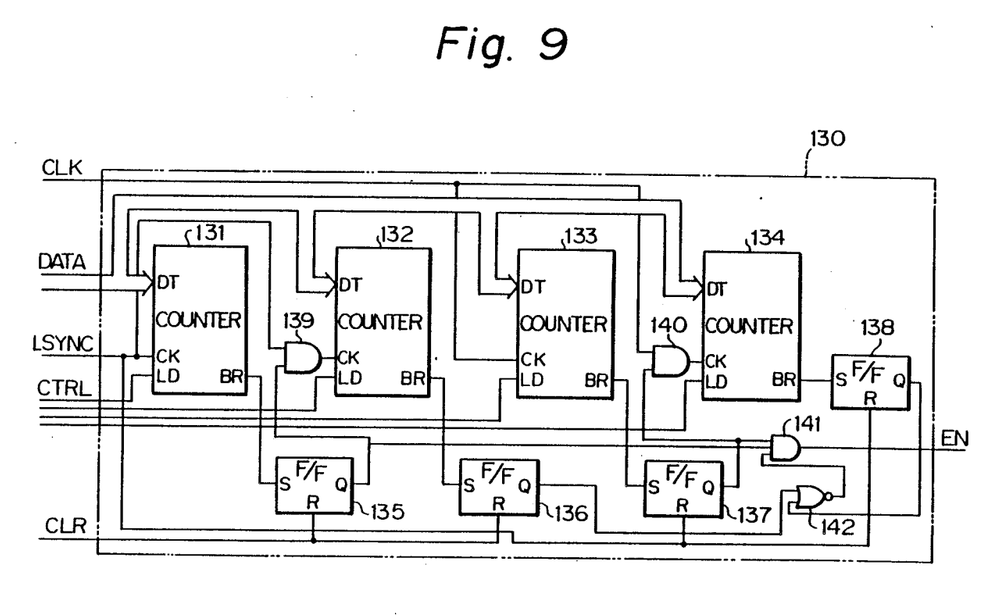
FIG. 9 is a schematic block diagram showing a specific construction of a region signal generating circuit.
Figure 10:
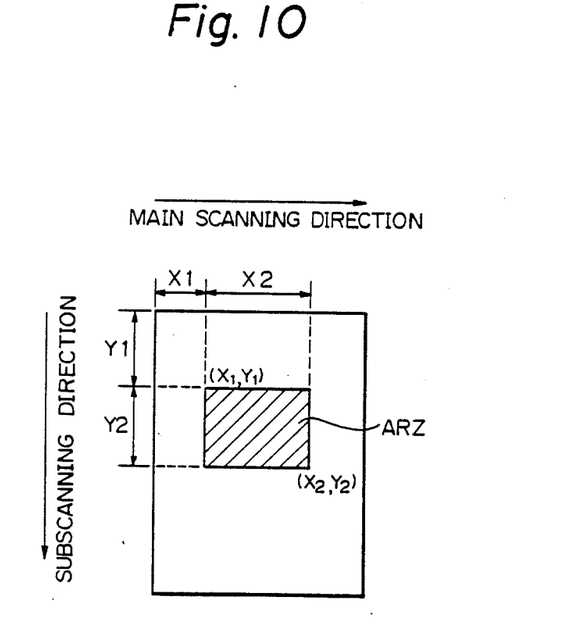
FIG. 10 is a schematic diagram showing a positional relationship between a marked region on an original document adapted for color conversion and coordinates which are loaded in a region signal generating circuit.

The other measure against the unwanted conversion mentioned earlier is limiting the region where conversion is to be effected to a preselected region. Specifically, if the region to perform conversion is limited to a relatively narrow region adjacent to a region in which the operator desires conversion, the probabability of unwanted conversion is reduced. For this purpose, in this particular embodiment, a signal line EN of a region signal generating circuit 13 shown in FIG. 9 is connected to the signal line EN which is connected to the address terminal of the ROM 171C. In the circuit of FIG. 8, conversion is allowed if the signal line EN is high level and inhibited if it is low level. Assuming that the operator intends to change color only in a region ARZ (indicating by hatching) of an original document shown in FIG. 10, he or she operates the numeral keys on the operation board 300 to enter the coordinates ($X_1$, $Y_1$) representative of the starting point of the region ARZ with respect to the main and subscanning directions and the coordinates ($X_2$, $Y_2$) representative of the ending point of the region ARZ and facing the coordinates ($X_1$, $Y_1$) on a diagonal of the same region. The coordinate data $X_1$, $Y_1$, $X_2$ and $Y_2$ entered are read by the main controller 200 and set in the region signal generating circuit 130.

Referring to FIG. 9, the region signal generating circuit 130 includes four counters 131, 132, 133 and 134, four flip-flops 135, 136, 137 and 138, AND gates 139, 140 and 141, and a NOR gate 142. Implemented with a presettable down-counter, each of the counters 131 to 134 has a data input terminal DT, a clock pulse input terminal CK, a preset control terminal LD, and a borrow signal output terminal BR. The previously mentioned coordinate data $Y_1$, $Y_2$, $X_1$ and $X_2$ are preset in, respectively, the counters 131, 132, 133 and 134 before a copying operation is started. Upon the start of a copying operation, clock pulses CLK and line synchronizing signals LSYNC which are produced by the image scanner 400 are applied to the circuit 130. The clock pulses CLK appear one for each pixel position in the main scanning direction while the line synchronizing signals appear one for each pixel position in the subscanning direction. The flip-flops 135 and 136 are reset prior at the start of a copying operation, and the flip-flops 137 and 138 are reset timed to the signals LSYNC. While the flip-flop 135 is reset, the counter 132 is disabled; while the flip-flop 137 is reset, the counter 134 is disabled. The counters 133 and 134 are reloaded with, respectively, the preset data $X_1$ and $Y_1$ every time the signal LSYNC appears.

When the instantaneous position in the main scanning direction reaches the coordinate $X_1$, the counter 133 responsive to the signals CLK becomes zero to make its borrow terminal BR high level, so that the flip-flop 137 is set. As a result, the signals CLK are routed to the counter 134 via the AND gate 140 while, at the same time, the counter 134 starts counting them. As the position $X_1 + X_2$ in the main scanning direction is reached, the counter 134 becomes zero to render its borrow terminal BR high level, thereby setting the flip-flop 138. When the instantaneous position in the subscanning direction reaches the coordinate $Y_1$, the counter 131 responsive to the signals LSYNC becomes zero resulting that the borrow terminal BR thereof is made high level to set the flip-flop 135. In this condition, the signals LSYNC are applied to and counted by the counter 132 via the AND gate 139. Further, when the coordinate $Y_1 + Y_2$ in the subscanning direction is reached, the counter 132 becomes zero to turn its borrow terminal to high level and, thereby, sets the flip-flop 136. It is only when both the flip-flops 135 and 136 are set and both the slip-flops 136 and 138 are reset that the signal line EN becomes high level, i.e., that color conversion is allowed. Specifically, color conversion is allowed only when the scanning position of the copier lies in the region ARZ and inhibited when otherwise.

Referring to FIG. 8 again, the data stored in the ROM 171C are so set as to execute color conversion which is identical in content as that the Table 1. However, as for the condition for allowing color conversion, the data of ROM 171C are different from those of the ROM 171 which is shown in FIG. 7.

Figure 11:
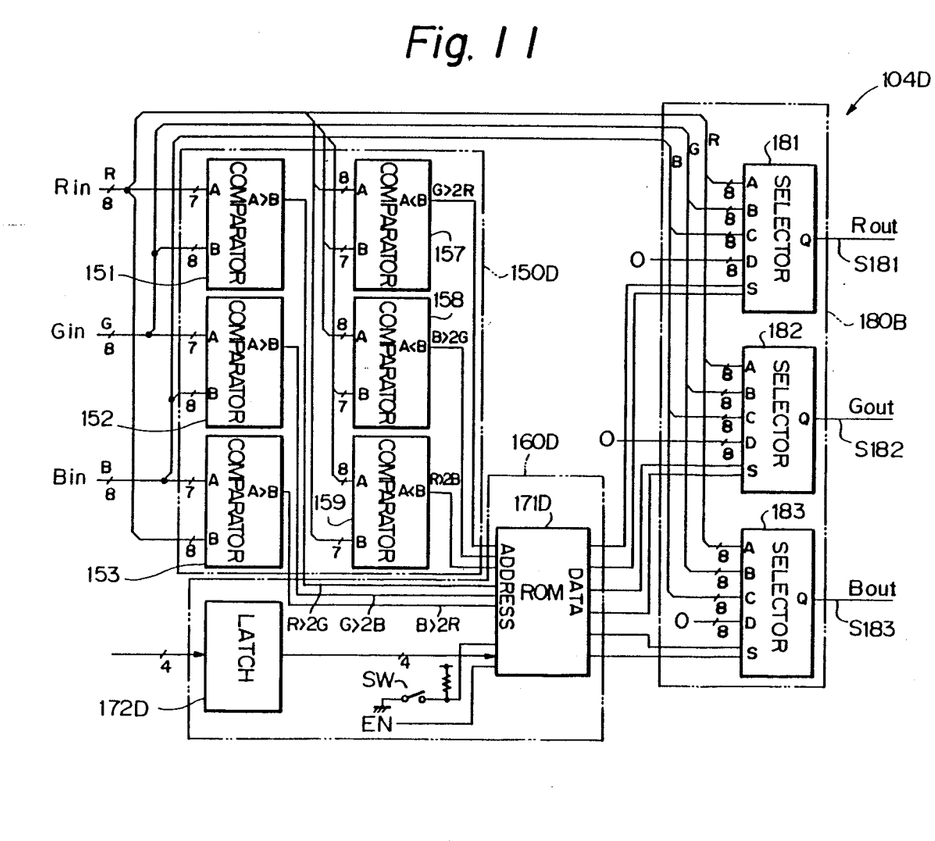
FIG. 11 is a schematic block diagram showing a farther specific construction of the color conversion circuit.

Referring to FIG. 11, a further specific construction of the color conversion circuit in accordance with the present invention is shown. As shown, the color conversion circuit, generally 104D, is constituted by an input color discriminating circuit 150D, a color conversion control circuit 160D, and a signal selecting circuit 180D. This embodiment differs from that of FIG. 8 in that one bit is added to the address terminal of the ROM 171D, and in that a switch SW is connected thereto. Further, each data selector of the signal selecting circuit 180D is provided with four input terminals A, B, C and D, zero being fixedly applied to the terminal D. While the switch SW is turned off, there occurs an operation which is essentially the same as that shown in Table 2. However, while the switch SW is turned on, the operation changes as shown in Table 3 below.

TABLE 3

| CCHGB | OUTPUT TERMINAL | | | COLOR CONVERSION |
|---|---|---|---|---|
|  | Rout | Gout | Bout |  |
| 0 | $R_{signals}$ | $G_{signals}$ | $B_{signals}$ | NO |
| 1 | $G_{signals}$ | $R_{signals}$ | $B_{signals}$ | R → G |
| 2 | $B_{signals}$ | $G_{signals}$ | $R_{signals}$ | R → B |
| 3 | $R_{signals}$ | $R_{signals}$ | $B_{signals}$ | R → Y |
| 4 | $R_{signals}$ | $G_{signals}$ | $R_{signals}$ | R → M |
| 5 | 0 | $R_{signals}$ | $R_{signals}$ | R → C |
| 6 | $R_{signals}$ | $B_{signals}$ | $G_{signals}$ | G → B |
| 7 | $G_{signals}$ | $R_{signals}$ | $B_{signals}$ | G → R |
| 8 | $G_{signals}$ | $G_{signals}$ | $B_{signals}$ | G → Y |
| 9 | $G_{signals}$ | 0 | $G_{signals}$ | G → M |
| 10 | $R_{signals}$ | $G_{signals}$ | $G_{signals}$ | G → C |
| 11 | $B_{signals}$ | $G_{signals}$ | $R_{signals}$ | B → R |
| 12 | $R_{signals}$ | $B_{signals}$ | $G_{signals}$ | B → G |
| 13 | $B_{signals}$ | $B_{signals}$ | 0 | B → Y |
| 14 | $B_{signals}$ | $G_{signals}$ | $B_{signals}$ | B → M |
| 15 | $R_{signals}$ | $B_{signals}$ | $B_{signals}$ | B → C |

Specifically, in the arrangement shown in FIG. 11, when any of the colors Y, M and C is selected as an alternative color and if, among the colors R, G and B, the remaining color components B, G and R which are not related to them are not related to the alternative color, the switch SW may be operated as desired to determine whether or not to reduce the levels of the remaining color components to zero.

It is to be noted that the color conversion circuit installed in a circuit which handles R, G and G signals in each of the foregoing embodiments may alternatively be installed in a circuit which deals with Y, M and C signals.

In summary, it will be seen that a digital color converting apparatus of the present invention implements color conversion with an extremely simple construction. Moreover, color conversion which is not desired by an operator hardly occurs because, even if a color to be changed with another contains a basic color, color conversion is inhibited unless a composite color of a plurality of basic colors is the same as the color to be changed.

Various modifications will become possible for those skilled in the art after receiving the teachings of the present disclosure without departing from the scope thereof.

What is claimed is:

1. A digital color converting apparatus comprising:
   color discriminating means for determining a relationship in magnitude between at least two input image signals, wherein each input image signal is associated with a respective one of a plurality of basic separated colors and each output signal is a multi-level signal represented by a plurality of bits;
   color specifying means for producing electric signals which are individually associated with an original color to be changed and an alternative color each being associated with any of said basic colors;
   signal selecting means for selectively applying at least a part of said input image signals to a plurality of signal output terminals, wherein each of said signal output terminals is associated with a respective one of said basic colors; and
   control means for controlling said signal selecting means in response to said electric signals outputted by said color specifying means and an electric signal outputted by said color discriminating means.

2. An apparatus as claimed in claim 1, further comprising color image outputting means connected to said signal output terminals.

3. An apparatus as claimed in claim 2, wherein said control means comprises region specifying means for producing a signal representative of an instantaneous relationship between a preselected image region for color conversion and a position of said input image signals, whereby color conversion control is inhibited unless said region specifying means produces a predetermined coincidence signal.

4. An apparatus as claimed in claim 1, wherein when the magnitude of a first input image signal associated with said original color is higher than the magnitude of a second input image signal associated with said alternate color as decided by said color discriminating means, said control means controls said signal selecting means to apply said image signal associated with said original color to said signal output terminal which is assigned to said alternative color.

5. An apparatus as claimed in claim 4, wherein said control means comprises region specifying means for producing a signal representative of an instantaneous relationship between a preselected image region for color conversion and a position of said input image signals, whereby color conversion control is inhibited unless said region specifying means produces a predetermined coincidence signal.

6. An apparatus as claimed in claim 1, wherein when the magnitude of a first input image signal associated with said original color is higher than the magnitude of a second input image signal associated with said alternate color as decided by said color discriminating means, said control means controls said signal selecting means to apply said image signal associated with said original color to said signal output terminal which is assigned to said alternative color and applies said input image which is associated with said alternative color to said signal output terminal which is associated with said original color.

7. An apparatus as claimed in claim 1, wherein said control means comprises region specifying means for producing a signal representative of an instantaneous relationship between a preselected image region for color conversion and a position of said input image signals, whereby color conversion control is inhibited unless said region specifying means produces a predetermined coincidence signal.

8. An apparatus as claimed in claim 4, wherein said control means comprises region specifying means for producing a signal representative of an instantaneous relationship between a preselected image region for color conversion and a position of said input image signals, whereby color conversion control is inhibited unless said region specifying means produces a predetermined coincidence signal.

9. A digital color converting apparatus comprising:
   first color discriminating means and second color discriminating means wherein each of said first and second color discriminating means receives a plurality of multibit input image signals, which are each associated with a repsective one of a plurality of basic separated colors, and the first color discriminating means determines a relationship in magnitude between at least two of the input image signals and the second color discriminating means identifies the received signal having the highest magnitude;
   color specifying means for producing an electric signal associated with an original color to be changed to an alternative color and associated with any of said basic colors;
   signal selecting means for selectively applying at least a part of said input image signals to a plurality of signal output terminals which are each assigned to a respective one of said basic colors; and
   control means for controlling said signal selecting means in response to said electric signal outputted by said color specifying means and an electric signal outputted by each of said first and second color discriminating means.

10. An apparatus as claimed in claim 9, further comprising color image outputting means connected to said signal output terminals.

11. An apparatus as claimed in claim 10, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

12. An apparatus as claimed in claim 9, wherein said second color identified by said color discriminating means is coincident with said original color, said control means controls said signal selecting means to apply said input image signal associated with said original color to one of said signal output terminals which is assigned to said alternative color.

13. An apparatus as claimed in claim 12, wherein when said second color identified by said color discriminating means is coincident with said original color, said control means control said signal selecting means to apply said input image signal associated with said original color to said signal output terminal which is assigned to said alternative color and applies said input image signal associated with said alternative color to said signal output terminal which is associated with said original color.

14. An apparatus as claimed in claim 13, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

15. An apparatus as claimed in claim 12, wherein when said alternative color is rendered by a combination of said basic colors, said control means controls said signal selecting means to apply said input image signal associated with said original color to said signal output terminals which are individually assigned to said basic colors which render said alternative color.

16. An apparatus as claimed in claim 15, wherein when said alternative color is rendered by a combination of a first and a second color of said basic colors and said original color is a third color of said basic colors, said control means controls said signal selecting means to apply said input image signal associated with said third color to said signal output terminals which are individually assigned to said first and second colors and applies one of said input image signals individually associated with said first and second colors to said signal output terminal which is assigned to said third color.

17. An apparatus as claimed in claim 16, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

18. An apparatus as claimed in claim 15, wherein when said alternative color is rendered by a combination of a first and a second color of said basic colors and said color to be changed is a third color of said basic colors, said control means controls said signal selecting means to apply said input image signal associated with said third color to said signal output terminals which are individually associated with said first and second colors and applies one of said input image signals individually associated with said first and second colors which is higher in magnitude than the other to said signal output terminal which is assigned to said third color.

19. An apparatus as claimed in claim 18, wherein said control means comprises region specifying means for outputting a signal representative of an instananeous relationship between a preselected image region for color conversion and a position of said input image signals, whereby color conversion is inhibited unless said region specifying means produces a predetermined coincidence signal.

20. An apparatus as claimed in claim 15, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

21. An apparatus as claimed in claim 12, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

22. An apparatus as claimed in claim 9, wherein said control means inhibits color conversion unless one of said input image signals which has the highest magnitude is at least twice higher in magnitude than another of said input image signals having the second highest magnitude.

23. An apparatus as claimed in claim 22, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

24. An apparatus as claimed in claim 9, wherein said control means comprises region specifying means for outputting a signal representative of an instantaneous relationship between a preselected image region for color conversion and a position of said input image signals, whereby color conversion is inhibited unless said region specifying means produces a predetermined coincidence signal.

* * * * *